(12) United States Patent
Kawada et al.

(10) Patent No.: US 11,124,139 B2
(45) Date of Patent: *Sep. 21, 2021

(54) VEHICLE CONVERSATION INFORMATION OUTPUT DEVICE AND CONVERSATION INFORMATION OUTPUT METHOD

(71) Applicant: KAWASAKI JUKOGYO KABUSHIKI KAISHA, Kobe (JP)

(72) Inventors: Hisanosuke Kawada, Kobe (JP); Masayuki Enomoto, Kobe (JP); Daisuke Kawai, Kobe (JP); Kazuhiro Ichikawa, Kobe (JP); Masanori Kinuhata, Kobe (JP); Hiroshi Ishii, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/604,967

(22) PCT Filed: Apr. 12, 2017

(86) PCT No.: PCT/JP2017/015011
§ 371 (c)(1),
(2) Date: Oct. 11, 2019

(87) PCT Pub. No.: WO2018/189840
PCT Pub. Date: Oct. 18, 2018

(65) Prior Publication Data
US 2020/0156573 A1    May 21, 2020

(51) Int. Cl.
*G10L 15/22*    (2006.01)
*B60R 16/037*    (2006.01)
(Continued)

(52) U.S. Cl.
CPC ....... *B60R 16/0373* (2013.01); *B60W 30/025* (2013.01); *B60W 40/09* (2013.01);
(Continued)

(58) Field of Classification Search
CPC .............................. G10L 15/22; G07C 5/0808
(Continued)

(56) References Cited

U.S. PATENT DOCUMENTS 6,175,772 B1    1/2001 Kamiya et al.
6,249,720 B1    6/2001 Kubota et al.
(Continued)

FOREIGN PATENT DOCUMENTS

EP    2821977 A1    1/2015
JP    H10-289006 A    10/1998
(Continued)

*Primary Examiner* — Leonard Saint Cyr
(74) *Attorney, Agent, or Firm* — Alleman Hall Creasman & Tuttle LLP (57) ABSTRACT

A vehicle conversation information output device is included in a vehicle conversation information output system configured to output conversation information to a driver driving a vehicle, the conversation information being created according to a predefined personality, the device including: a receiving part that obtains usage information related to how the vehicle has been used by the driver; a modifying part that modifies the predefined personality based on the usage information obtained by the receiving part; a creating part that creates conversation information to be output to the driver based on the personality modified by the modifying part; and an outputting part that outputs the conversation information created by the creating part to the driver.

10 Claims, 2 Drawing Sheets

(51) Int. Cl.
*B60W 30/02* (2012.01)
*B60W 40/09* (2012.01)
*B60W 40/08* (2012.01)

(52) U.S. Cl.
CPC ........ *G10L 15/22* (2013.01); *B60W 2040/089* (2013.01); *G10L 2015/225* (2013.01); *G10L 2015/227* (2013.01); *G10L 2015/228* (2013.01)

(58) Field of Classification Search
USPC .................................................. 704/270–275
See application file for complete search history.

(56) References Cited

U.S. PATENT DOCUMENTS

| | | | |
|---|---|---|---|
| 2003/0060937 A1 | 3/2003 | Shinada et al. | |
| 2008/0319602 A1* | 12/2008 | McClellan | G07C 5/008 701/31.4 |
| 2010/0017236 A1* | 1/2010 | Duddle | G06Q 40/08 705/4 |
| 2012/0209474 A1* | 8/2012 | Morris | B62D 1/046 701/42 |
| 2013/0054090 A1 | 2/2013 | Shin et al. | |
| 2014/0125474 A1* | 5/2014 | Gunaratne | G08G 1/163 340/439 |
| 2015/0160020 A1* | 6/2015 | van Hemert | A61B 5/18 701/532 |
| 2016/0246298 A1 | 8/2016 | Sato et al. | |
| 2017/0015318 A1* | 1/2017 | Scofield | B64C 39/024 |
| 2017/0043782 A1* | 2/2017 | Farrell | B60W 40/08 |
| 2017/0061798 A1* | 3/2017 | Linder | H04W 4/029 |
| 2017/0315550 A1 | 11/2017 | Ichikawa et al. | |
| 2018/0143639 A1 | 5/2018 | Singhal et al. | |
| 2018/0314266 A1 | 11/2018 | Shalev-Shwartz et al. | |
| 2019/0039618 A1 | 2/2019 | Mori | |
| 2019/0276036 A1 | 9/2019 | Noguchi et al. | |
| 2020/0104096 A1 | 4/2020 | Tokunaga et al. | |

FOREIGN PATENT DOCUMENTS

| | | |
|---|---|---|
| JP | H1183683 A | 3/1999 |
| JP | H11259271 A | 9/1999 |
| JP | H11259446 A | 9/1999 |
| JP | H11305862 A | 11/1999 |
| JP | 2002071379 A | 3/2002 |
| JP | 2002304362 A | 10/2002 |
| JP | 200372488 A | 3/2003 |
| JP | 2005291030 A | 10/2005 |
| JP | 2006233870 A | 9/2006 |
| JP | 2007263242 A | 10/2007 |
| JP | 2013169873 A | 9/2013 |
| JP | 2014031050 A | 2/2014 |
| JP | 2016095572 A | 5/2016 |
| WO | 2013128919 A1 | 9/2013 |

* cited by examiner

Fig.2

VEHICLE CONVERSATION INFORMATION OUTPUT DEVICE AND CONVERSATION INFORMATION OUTPUT METHOD

TECHNICAL FIELD

The present invention relates to a vehicle conversation information output device and conversation information output method for outputting, to a driver driving a vehicle, conversation information created according to a predefined personality.

BACKGROUND ART

Patent Literature 1 discloses a technology that gives human-like characteristics to a straddle vehicle and enables the straddle vehicle to make conversations with the user of the vehicle.

CITATION LIST

Patent Literature

Patent Literature 1: Japanese Laid-Open Patent Application Publication No. H10-289006

SUMMARY OF INVENTION

Technical Problem

The technology disclosed in Patent Literature 1 takes into consideration the intention of the user when outputting information. However, the driver may easily get bored because the same information is repeatedly output under the same situation.

It is therefore an object of the present invention to provide a vehicle conversation information output device and a conversation information output method that enable a vehicle to output a wide variety of information.

Solution to Problem

A vehicle conversation information output device of the present invention is included in a vehicle conversation information output system configured to output conversation information to a driver driving a vehicle, the conversation information being created according to a predefined personality, the device including: an obtaining part that obtains usage information related to how the vehicle has been used by the driver; a modifying part that modifies the predefined personality based on the usage information obtained by the obtaining part; a creating part that creates conversation information to be output to the driver based on the personality modified by the modifying part; and an outputting part that outputs the conversation information created by the creating part to the driver.

According to the present invention, the personality set in the conversation information output device is changed depending on how the vehicle has been used by the driver. Changing the personality can increase the variety of the contents of the information to be output.

In the present invention, the usage information may include experience-based variable information that varies with increasing experience of the driver in using the vehicle.

With the above configuration, the personality can be changed according to the experience of the driver in using the vehicle, and the variety of the information to be output can be increased with increasing experience of the driver in using the vehicle. This enables the driver to feel as if the vehicle also gained experience and changed with increase of the driver's experience.

In the present invention, the experience-based variable information may include at least one of a cumulative travel distance, a cumulative travel time, cumulative years of use, a cumulative record of traveled areas, and a cumulative time of travel at a predetermined range of speeds.

With the above configuration, information related to a travel history which varies with increasing experience of the driver in using the vehicle can be used as the experience-based variable information. By changing the personality based on such information, personality modification can easily be accomplished according to the driver's experience.

In the present invention, the usage information may include driving tendency information representing the tendency of driving operations performed by the driver during travel.

With the above configuration, the personality can be changed based on the driving tendency information which varies depending on who the driver is, and the variety of the information to be output can be further increased.

In the present invention, the modifying part may be configured to stop modifying the personality when a predetermined condition is satisfied.

With the above configuration, undesired modification of the personality can be prevented by setting the condition under which the modifying part stops modifying the personality.

In the present invention, the usage information may include vehicle body information related to a vehicle body of the vehicle.

With the above configuration, since the vehicle body information is taken into account for modification of the personality, the personality is modified not only according to how the vehicle has been used but according to the state of the vehicle itself. This further increases the variety of the information to be output.

A conversation information output method of the present invention is a conversation information output method for outputting conversation information to a driver driving a vehicle, the method including: obtaining usage information related to how the vehicle has been used by the driver; and outputting conversation information to the driver based on the obtained usage information, wherein the usage information includes experience-based variable information that varies with increasing experience of the driver in using the vehicle.

With the above configuration, the information to be output is selected based on the experience of the driver in using the vehicle. Thus, the variety of the information to be output can be increased.

In the present invention, the method may further include: storing experience information in memory, the experience information being related to an experience undergone by the driver during travel; and outputting the stored experience information.

The above configuration can give the driver the impression of sharing memory of experiences undergone during travel with the vehicle. This leads the driver to develop an affection for the straddle vehicle.

Advantageous Effects of Invention

The present invention enables a vehicle to output a wide variety of information.

DESCRIPTION OF EMBODIMENTS

Hereinafter, a conversation information output device 13 according to an embodiment of the present invention will be described with reference to the drawings. The conversation information output device 13 described below is merely an embodiment of the present invention. Thus, the present invention is not limited to the embodiment, and an element may be added, omitted, or modified without departing from the gist of the invention.

Some vehicles, including straddle vehicles such as motorcycles and all terrain vehicles (ATVs), are endowed with human-like characteristics, which allow the driver of such a vehicle to feel as if he/she had a conversation with the vehicle. In the present embodiment, a conversation information output system 1 is employed in a motorcycle 2 shown in FIG. 1 to provide such a feeling. Hereinafter, the conversation information output system 1 will be described.

<Conversation Information Output System>

Figure 1:
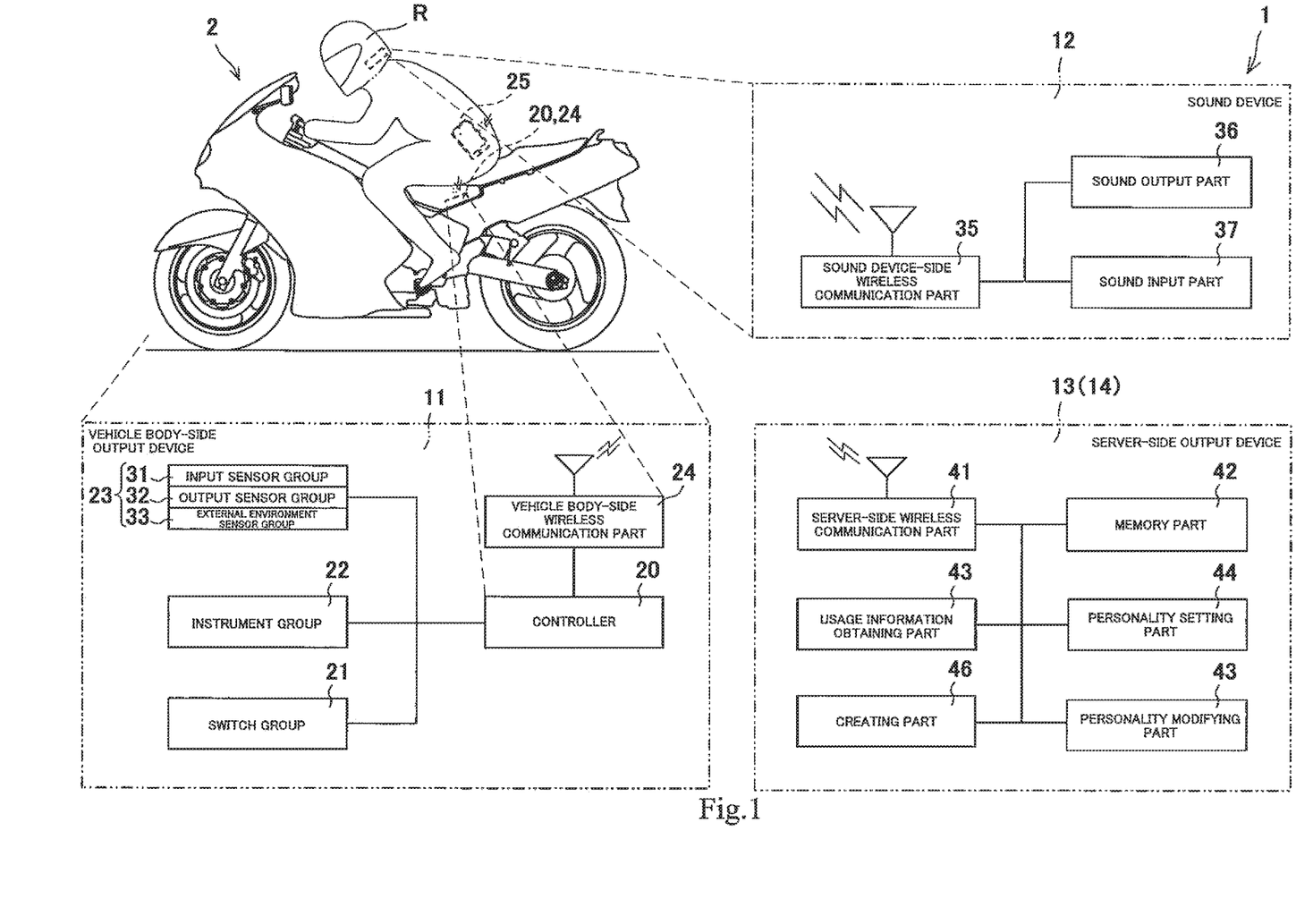
FIG. 1 is a block diagram showing the configuration of a conversation information output system including a conversation information output device according to an embodiment of the present invention.

The conversation information output system 1 is configured to receive input information from a driver R and respond to the input information by outputting conversation information based on a predefined personality. Additionally, the conversation information output system 1 is configured to modify the predefined personality based on various information. The conversation information output system 1 having these functions includes a vehicle body-side output device 11, a sound device 12, and a conversation information output device 13. The vehicle body-side output device 11 is installed in the vehicle body of the motorcycle 2, and the sound device 12 is mounted, for example, in a helmet worn by the driver R. The conversation information output device 13 is implemented by a server remote from the vehicle body, such as by a cloud server 14. The cloud server 14 is a server constructed on the cloud platform accessible by different clients via the Internet. In the conversation information output system 1 having such a configuration, the vehicle body-side output device 11, the sound device 12, and the conversation information output device 13 are configured as described below.

The vehicle body-side output device 11 includes a controller 20, a switch group 21, an instrument group 22, a vehicle sensor group 23, and a vehicle body-side wireless communication part 24. The controller 20 includes an engine ECU and a brake ECU. The engine ECU is configured to electronically control a throttle device, a fuel injector, and an igniter. The engine ECU is configured to further perform auxiliary control for cutting off fuel supply or disabling ignition, in addition to the basic electronic control. The brake ECU is configured to control the operation of the brake mechanism to prevent locking of the front and rear wheels (ABS) and is configured to control the distribution of braking forces acting on the front and rear wheels (CBS). The controller 20 need not necessarily include both the engine ECU and the brake ECU, and may include the engine ECU only. The controller 20 thus configured is electrically connected to the switch group 21, the instrument group 22, the vehicle sensor group 23, and the vehicle body-side wireless communication part 24.

The switch group 21 is constituted by a plurality of switches operable to enable and disable supply of electric power to various devices, and the plurality of switches include, for example, a main power supply switch. The main power supply switch outputs either ON signal or OFF signal to the controller 20 in response to a switching operation performed on the main power supply switch. Upon receiving ON signal, the controller 20 starts to electronically control the devices as control targets. Upon receiving OFF signal, the controller 20 stops the operation of the devices as control targets. Further, the controller 20 is configured to, upon receiving ON signal, supply electric power to the instrument group 22 to activate the instrument group 22. The instrument group 22 is configured to display various information and includes, for example, a distance meter, a speed meter, a rotational speed meter, and a clock. The instrument group 22 is configured to obtain information associated with the meters (i.e., the cumulative travel distance, the speed of the vehicle body, the engine speed, and the time of day) from the controller 20 and display the obtained information. The controller 20 is connected to the vehicle sensor group 23 and configured to obtain various information from the vehicle sensor group 23.

The vehicle sensor group 23 includes an input sensor group 31, an output sensor group 32, and an external environment sensor group 33. The input sensor group 31 is configured to detect input operations made on the vehicle body through actions of the driver R. For example, the input sensor group 31 detects accelerator operation, brake operation, clutch lever operation, gear-shifting operation, steering operation, weight shift operation, and cornering operation which are performed by the driver R. Further, the input sensor group 31 is configured to, based on the detected input operation, send input operation information to the controller 20, and the controller 20 is configured to control the operation of the control target devices based on the input operation information.

More specifically, the input sensor group 31 includes, for example, a throttle opening degree sensor (TH opening degree sensor), a brake position sensor, a clutch sensor, a gear position sensor, a steering angle sensor, load sensors, and a gyro sensor. The throttle opening degree sensor (TH opening degree sensor) detects the amount of accelerator operation by the driver R based on the opening degree of the throttle valve. The brake position sensor detects the amount of brake operation by the driver R based on the positions of the brake lever and brake pedal. The clutch sensor detects clutch operation by the driver R based on whether the clutch lever is operated. The gear position sensor detects gear-shifting operation by the driver R based on switching of the gear positions. The steering angle sensor detects steering operation by the driver R based on the rotation angle of the steering shaft (the steering angle of the front wheel). The load sensors include a load sensor provided on the front seat of the motorcycle 2, a load sensor provided on the rear seat of the motorcycle 2, and load sensors provided on the left and right steps on which the driver places his/her feet. These load sensors respectively detect the weight of the driver R, the weight of a passenger, and the weight distribution between the left and right sides of the driver R (i.e., the lateral weight shift of the driver R). The gyro sensor is configured to detect the angular accelerations, angular velocities, or angular displacements about three perpendicular axes of the vehicle body. In the present embodiment, the gyro sensor detects the roll angle, pitch angle, and yaw angle of the vehicle body. Thus, for example, the gyro sensor can detect cornering operation by the driver R.

The output sensor group 32 is configured to detect outputs provided by various devices of the vehicle body in response to input operations. For example, the output sensor group 32 detects the wheel speed, engine speed, and steering torque of the motorcycle 2. Further, the output sensor group 32 is configured to, based on the detected outputs, send output information to the controller 20, and the controller 20 is configured to, based on the output information, send the wheel speed and engine speed to the instrument group 22 and cause the instrument group 22 to display the wheel speed and engine speed. More specifically, the output sensor group 32 includes, for example, a wheel speed sensor, an engine speed sensor, and a strain sensor. The wheel speed sensor detects the respective rotational speeds of the front and rear wheels, i.e., the wheel speed. The engine speed sensor detects the rotational speed of the engine. The strain sensor detects the amount of strain about the axis of the steering shaft to detect the steering torque.

The external environment sensor group 33 is configured to detect information related to the surrounding environment of the motorcycle 2. For example, the external environment sensor group 33 detects the current location of the motorcycle 2, the temperature of the surroundings of the motorcycle 2, and the brightness (i.e., illuminance) of the surroundings of the motorcycle 2. The external environment sensor group 33 sends output information to the controller 20 based on the detected outputs. More specifically, the external environment sensor group 33 includes, for example, a GPS sensor, a temperature sensor, and an illuminance sensor. The GPS sensor detects the current location of the motorcycle 2, the temperature sensor detects the temperature of the surroundings of the motorcycle 2, and the illuminance sensor detects the brightness (i.e., illuminance) of the surroundings of the motorcycle 2.

As described above, the vehicle sensor group 23 includes a plurality of sensors, and outputs various information detected by the sensors to the controller 20. The controller 20 is configured to, based on the received various information, control the operation of the control target devices or put other devices into operation. The controller 20 is connected to the vehicle body-side wireless communication part 24. The vehicle body-side wireless communication part 24 is configured to communicate with a mobile information terminal 25 by near-field communication using a technology such as Bluetooth (registered trademark). The mobile information terminal 25 is configured to execute applications based on received information and display various information. The mobile information terminal 25 is also operable by the driver to output information. The mobile information terminal 25 is connectable to the Internet via an unillustrated base station, and serves also as a relay for connecting the vehicle body-side wireless communication part 24 to the Internet. Thus, the vehicle body-side wireless communication part 24 can be connected to the Internet via the mobile information terminal 25 and can communicate with the conversation information output device 13 via the Internet. This allows the controller 20 to output information detected by the vehicle sensor group 23 to the conversation information output device 13 via the vehicle body-side wireless communication part 24. The motorcycle 2 is assigned a unique identification number for differentiating the motorcycle 2 from other motorcycles 2, and the vehicle body-side wireless communication part 24 is configured to output various information with the identification number to the conversation information output device 13.

The vehicle body-side wireless communication part 24 is configured to communicate with the sound device 12 by near-field communication as mentioned above, and exchange sound information (sound signals) with the sound device 12. The sound device 12 includes a sound device-side wireless communication part 35, a sound output part 36, and a sound input part 37. The sound device-side wireless communication part 35 is configured to exchange sound information with the vehicle body-side wireless communication part 24 of the vehicle body-side output device 11. The sound device-side wireless communication part 35 is connected to the sound output part 36 and the sound input part 37. The sound output part 36 is, for example, a speaker, which is attached inside the helmet so as to be located in the vicinity of an ear of the driver R. The sound output part 36 need not necessarily be a speaker, and may be an earphone. The sound output part 36 is not necessarily limited to being of the sound emission type, and may be of the bone conduction type. The sound output part 36 is configured to receive sound information sent from the vehicle body-side wireless communication part 24 via the sound device-side wireless communication part 35 and output the sound information in the form of sound (e.g., non-verbal sound such as alarm or voice made up of natural language).

The sound input part 37 is, for example, a microphone, which is attached to the helmet so as to be located in the vicinity of the mouth of the driver R. The sound input part 37 is not limited to a microphone, and may be of the bone conduction type. The sound input part 37 collects sound emitted by the driver R. That is, the driver R can input a voice made up of natural language through the sound input part 37, and the sound input part 37 is configured to convert the input voice to sound information and send the sound information to the sound device-side wireless communication part 35. Upon receiving the sound information sent from the sound input part 37, the sound device-side wireless communication part 35 sends the sound information to the vehicle body-side wireless communication part 24 of the vehicle body-side output device 11 by near-field communication. The sent sound information is associated with the above-described identification information and transmitted together with the identification information to the conversation information output device 13 via the vehicle body-side wireless communication part 24 and the mobile information terminal 25.

The conversation information output device 13 includes a server-side wireless communication part 41 and a memory part 42. The server-side wireless communication part 41, which is an example of the outputting part, exchanges information with the vehicle body-side wireless communication part 24 by wireless communication. The memory part 42 stores the received information in association with the corresponding identification number transmitted together with the information. The conversation information output device 13 includes a usage information obtaining part 43, and the usage information obtaining part 43 is configured to obtain usage information based on the received information stored in the memory part 42. The usage information is information related to how the vehicle has been used by the driver R, and includes experience-based variable information. The experience-based variable information is information that varies with increasing experience of the driver R in using the vehicle. For example, the experience-based variable information includes a cumulative travel distance, a cumulative travel time, cumulative years of use, a cumulative record of traveled areas, and a cumulative time of travel in a speed range. The information included in the experience-based variable information is not necessarily limited to those mentioned above, and the experience-based variable information may include a travel speed at which the driver continues driving, an average travel speed, arrival at a particular spot, the number of times of official vehicle inspection, the number of times of fueling, the degree of extension of the traveled area from the location where initial setting was made, the presence/absence of programs for the ECUs, and the degree of proficiency in the driver's driving.

The cumulative travel distance is the sum of distances the driver R has traveled by the motorcycle 2. The usage information obtaining part 43 obtains the cumulative travel distance which is transmitted from the controller 20 and stored in the memory part 42. The cumulative travel time is the sum of durations the driver R has spent in traveling by the motorcycle 2. For example, the cumulative travel time is calculated as follows. The information transmitted from the controller 20 and stored in the memory part 42 includes: notification that the clutch lever has been operated and ON signal has been output from the main power supply switch; the time of day of the output of ON signal; notification that OFF signal has been output from the main power supply switch; and the time of day of the output of OFF signal. The usage information obtaining part 43 calculates the difference between the two times of day in the information as a travel time, and obtains the sum of the thus calculated travel times as the cumulative travel time.

The cumulative years of use are elapsed years from the time of day at which initial setting (such as setting of the time of day indicated by the clock or initial setting of the personality described later) was made on the motorcycle 2. The cumulative years of use are calculated as follows. The usage information obtaining part 43 refers to time-of-day information possessed by itself, and calculates the cumulative years of use based on the difference between the year and month of the initial setting and the current year and month. The cumulative record of traveled areas is information related to areas that the driver R has traveled and is traveling by the motorcycle 2. The number of the areas is calculated as follows. A GPS obtains location information (e.g., the latitude and longitude) of areas which have been traveled, and the controller 20 outputs such location information to the server-side wireless communication part 41 at certain time intervals. The location information is stored in the memory part 42. The memory part 42 stores in advance data of a travelable region (i.e., land) divided in a plurality of areas. Based on the local information and divided areas stored in the memory part 42, the usage information obtaining part 43 incorporates previously-traveled areas and frequently-traveled areas into the cumulative record of traveled areas.

The cumulative time of travel in a speed range is a cumulative time of travel at a predetermined range of travel speeds (e.g., travel speeds equal to or higher than 30 km/h and lower than 60 km/h) and is calculated as follows. The controller 20 outputs the wheel speed to the server-side wireless communication part 41 at certain time intervals, and the values of the wheel speed are stored in the memory part 42 together with the time of day of the storage. The usage information obtaining part 43 selects wheel speed values equal to or higher than 30 km/h and lower than 60 km/h from among the stored wheel speed values, and calculates the sum of durations during which the wheel speed has had the selected values. In this manner, the usage information obtaining part 43 obtains the cumulative time of travel in a speed range.

The usage information includes driving tendency information in addition to the experience-based variable information. The driving tendency information is information representing the tendency of driving operations performed by the driver R on the motorcycle 2. The driving tendency information includes, for example, a typically-used engine speed range during travel, a typical travel speed range, the rate of change in steering torque, the manner of accelerator operation, the manner of brake operation, the timing of changing gears, the roll angle, and the frequency of driving. The typically-used engine speed range is one of a plurality of divided engine speed ranges (e.g., engine speed ranges divided at intervals of 1000 rpm) that contains the largest number of values of the engine speed which are obtained at certain time intervals during travel. The typically-used engine speed range is obtained as follows. The controller 20 outputs the engine speed to the server-side wireless communication part 41 at certain time intervals, and the values of the engine speed are stored in the memory part 42. The usage information obtaining part 43 sorts the stored values of the engine speed into the corresponding engine speed ranges and obtains, as the typically-used engine speed range, an engine speed range that contains the largest number of engine speed values.

The typical travel speed range is one of a plurality of divided travel speed ranges (e.g., travel speed ranges divided at intervals of 20 km/h) that contains the largest number of values of the wheel speed (i.e., travel speed) which are obtained at certain time intervals during travel. The typical travel speed range is obtained as follows. The controller 20 outputs the wheel speed to the server-side wireless communication part 41 at certain time intervals, and the values of the wheel speed are stored in the memory part 42. The usage information obtaining part 43 sorts the stored values of the wheel speed, i.e., the stored values of the travel speed, into the corresponding travel speed ranges and obtains, as the typical travel speed range, a travel speed range that contains the largest number of travel speed values.

The rate of change in steering torque is, for example, the rate of change in strain about the axis of the steering shaft. The controller 20 outputs the amount of strain about the axis of the steering shaft at certain time intervals, and the values of the amount of strain are stored in the memory part 42. The usage information obtaining part 43 calculates the rate of change in steering torque based on the stored values. The manner of accelerator operation is evaluated, for example, based on the rate of change in the amount of accelerator operation. The controller 20 outputs the amount of accelerator operation at certain time intervals, and the values of the amount of accelerator operation are stored in the memory part 42. The usage information obtaining part 43 calculates the rate of change in the amount of accelerator operation based on the stored values. The manner of brake operation is evaluated, for example, based on the rate of change in the amount of operation of the brake lever and brake pedal. The controller 20 outputs the amount of brake operation at certain time intervals, and the values of the amount of brake operation are stored in the memory part 42. The usage information obtaining part 43 calculates the rate of change in the amount of operation of the brake lever and brake pedal based on the stored values. The timing of changing gears is, for example, a timing at which the gear position is shifted from one to another. The usage information obtaining part 43 obtains the timing of changing gears by associating gear-shifting operation with the values of the engine speed which are output by the controller 20 at certain time intervals and stored in the memory part 42.

The roll angle is an angle at which the driver inclines the vehicle body of the motorcycle 2 when turning a corner during travel. The controller 20 outputs the roll angle detected by the gyro sensor at certain time intervals, and the values of the roll angle are stored in the memory part 42. The usage information obtaining part 43 obtains the roll angle based on the stored values. The frequency of driving represents how frequently the driver drives the motorcycle 2 (e.g., the number of times of driving during a predetermined period of time [one month, one week, or one day], the number of days of driving, the driving time, and the number of time zones in which the driver uses the motorcycle). The usage information obtaining part 43 calculates the frequency of driving based on the notifications that ON signal has been output from the main power supply switch and based on the times of day of the output of ON signal. The notifications and times of day of the output of ON signal are output from the controller 20 and stored in the memory part 42.

The usage information further includes vehicle body information. The vehicle body information is information related to the vehicle body. The vehicle body information includes, for example, the structural features of the vehicle body (e.g., the type of the motorcycle 2 and the types of the component parts such as the tires, suspensions, and muffler), the times of parts replacement, the times of inspection (routine inspection and official vehicle inspection), and the state of the vehicle body (the settings for component parts such as the setting of the geometry of the vehicle body and the setting of the suspensions). The usage information obtaining part 43 can obtain the vehicle body information by various methods, such as by receiving the information via the server-side wireless communication part 41 after the information is input to the mobile information terminal 25. Alternatively, the information may be input and obtained from a computer of a dealer at the time of purchase, parts replacement, or setting. For electronic components connected to the controller 20, information related to replacement and attachment of the electronic components may be obtained based on signals sent from the electronic components to the controller 20.

In the conversation information output device 13, as described above, the usage information obtaining part 43 obtains the usage information based on various information received by the server-side wireless communication part 41. The conversation information output device 13 is configured to set a personality of the motorcycle 2 based on the usage information and create conversation information based on the set personality. That is, the conversation information output device 13 gives human-like characteristics to the motorcycle 2 and enables conversations between the driver R and the motorcycle 2. In the present embodiment, the personality serves as a basis (rule) for determining the properties such as the contents, tone, and frequency of conversations with the driver R, and a change in the personality causes a change in the conversation properties. The personality is defined by a plurality of attributes, such as sex, age, occupation, place of residence, personal history, taste, and disposition. In the present embodiment, the attributes of the personality include sex, age, occupation, place of residence, disposition, and taste. The conversation information output device 13 causes the personality of the motorcycle 2 to change depending on the usage state of the motorcycle 2 and the condition of the motorcycle 2 itself just as the personality of a person changes with growth of the person. This allows the driver R to feel as if the motorcycle 2 were growing together with the driver R. The conversation information output device 13 having such a function further includes a personality setting part 44, a personality modifying part 45, and a creating part 46.

The personality setting part 44 is configured to make initial setting for the personality of the motorcycle 2. For example, the memory part 42 stores in advance a plurality of default personalities different from each other. That is, a plurality of personalities composed of different combinations of the attributes including sex, age, occupation, place of residence, and disposition are stored as default personalities in the memory part 42. The attributes of the default personalities can be set, for example, by analyzing the personalities of famous people for each attribute and making the setting according to the analysis results of the attributes. The default personalities stored in the memory part 42 are used, as already mentioned, when initial setting (or resetting) is made for the personality of the motorcycle 2.

More specifically, the personality setting part 44 causes the driver R to select any one of the default personalities stored in the memory part 42 in order to make initial setting or resetting for the personality of the motorcycle 2. For example, the personality setting part 44 transmits the default personalities stored in the memory part 42 to the mobile information terminal 25 via the server-side wireless communication part 41 and causes the mobile information terminal 25 to display the default personalities. After the driver R selects one of the default personalities on the mobile information terminal 25, the selected default personality is transmitted to the server-side wireless communication part 41 from the mobile information terminal 25. The transmitted default personality is stored in the memory part 42 as the personality of the motorcycle 2 (i.e., the default personality is stored together with identification information). The initial personality setting may be performed by a method other than that described above. For example, questions about the driver R himself/herself may be displayed and answered on the mobile information terminal 25, and a suitable personality may be set based on the answers. Alternatively, questions about the personality of the motorcycle 2 may be answered by the driver R on the mobile information terminal 25, and a personality favorable to the driver R may be created. The personality thus stored in the memory part 42 can be modified by the personality modifying part 45 based on the usage information. The following will describe an example of the modification of the personality.

As described above, the usage information stored in the memory part 42 includes the experience-based variable information, the driving tendency information, and the vehicle body information. The personality modifying part 45 modifies the personality by changing the attributes of the personality based on these information. The personality modifying part 45 modifies the personality as follows based on the experience-based variable information stored in the memory part 42. For example, upon an increase in the cumulative years of use included in the experience-based variable information, the personality modifying part 45 increments the age which is one of the attributes of the personality. Further, upon an increase in the cumulative travel distance and an increase in the cumulative travel time, the personality modifying part 45 changes the disposition so that the relationship of the motorcycle 2 with the driver R is changed from "acquaintance" to "friend" (e.g., the disposition is changed to "friendly"). Additionally, the personality modifying part 45 sets the place of residence according to the frequently-traveled areas in the cumulative record of traveled areas, and also changes the disposition to increase the level of "sociability" with extension of the previously-traveled areas. When many of the previously-traveled areas are located far from the place of residence, the taste, which is one of the attributes, is set to "keen traveler". Further, upon an increase in the cumulative time of travel in a speed range, the personality modifying part 45 changes the disposition to increase the level of "steadiness".

Additionally, the personality modifying part 45 modifies the personality as follows based on the driving tendency information stored in the memory part 42. For example, when the typically-used engine speed range is a high engine speed range, the personality modifying part 45 modifies the personality into a "bold" disposition, while when the typically-used engine speed range is a low engine speed range, the personality modifying part 45 modifies the personality into a "timid" disposition. When the typical travel speed range is a high speed range, the personality modifying part 45 modifies the personality into a "quick-tempered" disposition, while when the typical travel speed range is a low speed range, the personality modifying part 45 modifies the personality into an "easygoing" disposition. The personality modifying part 45 evaluates the driving skill and driving operation tendency of the driver R according to the rate of change in steering torque, the manner of accelerator operation, the manner of brake operation, the timing of changing gears, and the roll angle, and changes the disposition to, for example, "good patience", "easily bored", "coward", or "deliberate". The personality modifying part 45 is configured to change the occupation based on the frequency of driving. Specifically, in the case where the driver drives the motorcycle very frequently, such as when the driver drives the motorcycle almost every day, the personality modifying part 45 sets the level of occupational experience to "expert". In the case where the driver drives the motorcycle only occasionally, such as when the driver drives the motorcycle only on weekends, the personality modifying part 45 sets the level of occupational experience to "beginner".

The personality modifying part 45 modifies the personality as follows based on the vehicle body information stored in the memory part 42. That is, the personality modifying part 45 is configured to determine the occupation depending on the type of the motorcycle 2. For example, when the motorcycle is of the luxury type, the occupation is set to "butler". When the motorcycle is of the racing type, the occupation is set to "athlete". When the motorcycle is of the scooter type, the occupation is set to "student". The personality modifying part 45 changes the occupation according to the types of the component parts (such as the tires, suspensions, and muffler), and changes the disposition into "delicate" or "insensitive" depending on the times of parts replacement and the times of inspection. Further, the personality modifying part 45 modifies the personality also according to the various settings for the component parts.

The various information included in the usage information and the attributes changed by the personality modifying part 45 need not necessarily be in one-to-one correspondence as in the foregoing description. One attribute may be changed based on a plurality of information included in the usage information. For example, the skill of the driver R is evaluated based on a plurality of information included in the driving tendency information. Upon determining that the driving skill of the driver R is at the level of a beginner because of the slowness of accelerator operation and brake operation performed by the driver R, the personality modifying part 45 sets the occupation to "teacher". When the driver R is evaluated as a skilled driver because of the quickness of the accelerator operation and brake operation, the personality modifying part 45 sets the occupation to "salesperson". Upon determining that the driving is careful and smooth, the personality modifying part 45 sets the occupation to "butler". The personality modifying part 45 may be implemented by execution of an information processing system such as neural network, expert system, or random forest. In this case, upon obtaining various information as the usage information, the personality modifying part 45 may change the attributes in a combined fashion based on the obtained information.

As described above, the personality modifying part 45 changes the attributes of the personality of the motorcycle 2 based on the usage information, and the changed attributes of the personality are stored in the memory part 42 in association with the identification number of the motorcycle 2. As mentioned above, the stored attributes of the personality serve as a basis (rule) for determining the properties such as the contents, tone, and frequency of conversations made based on conversation information. The creating part 46 creates conversation information based on the attributes of the personality to establish communication with the driver R.

More specifically, the creating part 46 is implemented by execution of an information processing system such as neural network, expert system, or random forest. The creating part 46 learns in advance what was said by various people (e.g., famous people). That is, the personality (i.e., the combination of the attributes) of a person whose sayings are learned is input to the creating part 46 in association with the sayings of the person. This process is executed for various people to cause the creating part 46 to learn the contents, tone, and frequency of conversations made according to each personality. Based on the contents of the learning and the stored personalities, the creating part 46 creates conversation information (i.e., the contents and tone of conversations). Thus, the tone and contents of conversations vary according to the age which is one of the attributes of the personality, and the conversation information may incorporate a dialect depending on the place of residence. The tone and contents of conversations vary also according to the occupation and disposition. Further, the creating part 46 varies the frequency and timing of conversation information creation according to the attributes of the personality. The creating part 46 may be configured to create conversation information predetermined for different personalities to be set, without executing the information process as described above.

In the conversation information output device 13, as described above, the personality modifying part 45 modifies the personality of the motorcycle 2, and conversation information is created according to the modified personality. Additionally, the conversation information output device 13 has the function of disabling modification of the personality by the personality modifying part 45. For example, when a predetermined condition is satisfied, such as when a given operation is performed on the mobile information terminal 25 or a given travel area (e.g., a racing circuit) is traveled, the conversation information output device 13, upon being notified of the satisfaction of the condition, disables the modifying function of the personality modifying part 45 and maintains the personality as stored in the memory part 42. This can prevent an undesired modification of the personality, allowing the personality to remain a preferred personality.

The conversation information created by the conversation information output device 13 is information to be output through the sound output part 36 of the sound device 12 in the form of a voice made up of natural language. Specifically, the creating part 46 converts conversation information from text data to sound information by a voice synthesis software that converts text data to analog voice signals (examples of the software include ViaVoice [registered trademark] of IBM [registered trademark] and FineSpeech [registered trademark] of Fujitsu Limited [registered trademark]). The created sound information is sent from the creating part 46 to the server-side wireless communication part 41 and then wirelessly transmitted to the sound device 12 via the mobile information terminal 25 and the vehicle body-side wireless communication part 24. The sound device 12 obtains the conversation information by the sound device-side wireless communication part 35 and outputs the natural language voice from the sound output part 36. Thus, the conversation information is delivered to the driver R in the form of a voice. It is not necessary that the entire text included in the conversation information be converted to sound information. The main contents, in particular driving-related contents, of the information may be converted from text data to sound information and delivered to the driver R in the form of a voice.

The sound device 12 allows the driver R to vocally input his/her requests or answers to conversation information through the sound input part 37. The input sound information is wirelessly transmitted to the conversation information output device 13 via the sound device-side wireless communication part 35, the vehicle body-side wireless communication part 24, and the mobile information terminal 25. In the conversation information output device 13, the server-side wireless communication part 41 obtains the sound information, and the creating part 46 converts the sound information to text data by means such as the software as mentioned above. Subsequently, the creating part 46 creates new conversation information based on the text data and the stored personality. The new conversation information is then wirelessly transmitted to the sound device 12 from the conversation information output device 13 via the mobile information terminal 25 and the vehicle body-side wireless communication part 24. The sound device 12 delivers the new conversation information in the form of sound information to the driver R. This enables the driver R to feel as if he/she were having a conversation with the motorcycle 2.

Further, experience information related to experiences undergone by the driver R during travel are stored in the memory part 42. The cumulative record of traveled areas is stored as experience information in the memory part 42. When a travel area received by the server-side wireless communication part 41 is already included in the cumulative record of traveled areas stored in the memory part 42, the creating part 46 creates conversation information stating that the driver has traveled the current area in the past.

Figure 2:
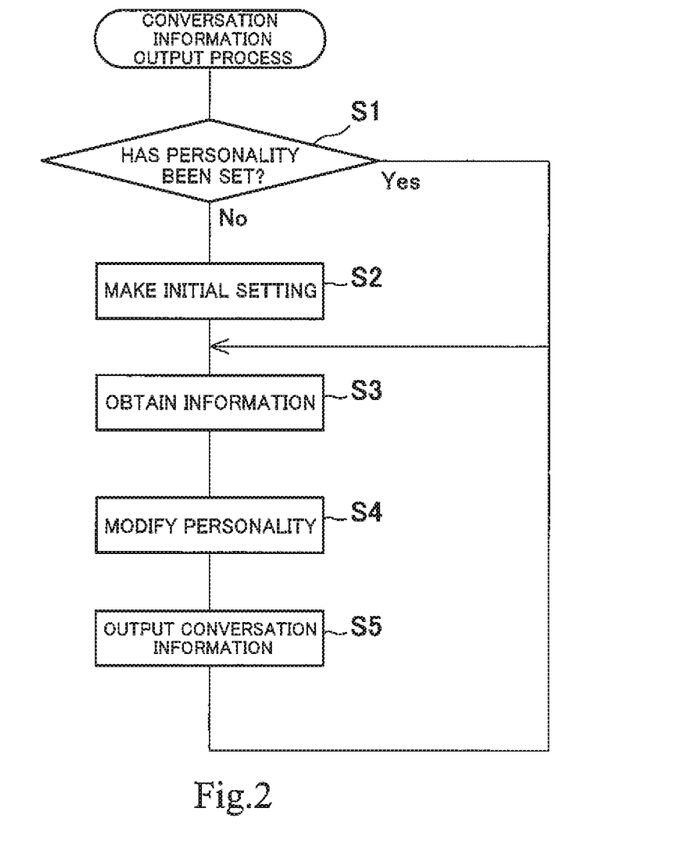
FIG. 2 is a flowchart illustrating the steps of an information output process executed by the information output device.

Hereinafter, the procedure (information output process) of creating conversation information based on the personality set in the conversation information output device 13 and outputting the conversation information in the form of a natural language voice from the sound output part 36 of the sound device 12 will be described with reference to the flowchart of FIG. 2. First, once the main power supply switch of the motorcycle 2 is operated, ON signal is output from the main power supply switch, and the conversation information output device 13 receives the notification of output of ON signal, together with the identification information, via the vehicle body-side wireless communication part 24. Thus, the conversation information output process starts and proceeds to step S1.

At step S1, which is a setting check step, the personality setting part 44 determines whether a personality is stored in association with the identification information in the memory part 42. If initial setting has not been made, the memory part 42 does not store any personality in association with the identification information. The conversation information output device 13 is configured to allow resetting of the personality through the mobile information terminal 25 or any other means, and once resetting operations are made, the personality stored in association with identification information in the memory part 42 is deleted. In such cases, the personality setting part 44 determines that no personality has been set, and the process proceeds to step S2.

At step S2, which is an initial setting step, a plurality of default personalities stored in the memory part 42 are transmitted to the mobile information terminal 25 via the server-side wireless communication part 41, and the mobile information terminal 25 is caused to display the default personalities. Once the driver R selects one of the default personalities, the selected default personality is stored into the memory part 42 in association with the above-described identification information. Once the selected personality is stored in association with the identification information or once the personality setting part 44 determines at step S1 that a personality has been stored in the memory part 42, the process proceeds to step S3.

At step S3, which is an information obtaining step, information related to how the motorcycle 2 has been used by the driver R, namely usage information, is obtained. Specifically, in the vehicle body-side output device 11, various information detected by the sensors included in the input sensor group 31, the output sensor group 32, and the external environment sensor group 33 are input to the controller 20. The controller 20 transmits the detected various information along with the identification information of the motorcycle 2 to the conversation information output device 13. This transmission is executed at predetermined time intervals. In the conversation information output device 13, the memory part 42 stores the transmitted various information, and the usage information obtaining part 43 obtains the usage information based on the stored various information. That is, the usage information obtaining part 43 obtains the experience-based variable information, driving tendency information, and vehicle body information as the usage information and stores these information into the memory part 42. Once the usage information is stored in the memory part 42, the process proceeds to step S4.

At step S4, which is a personality modifying step, it is determined whether the usage information stored in the memory part 42 satisfies a predetermined condition, and upon satisfaction of the condition, the personality modifying part 45 modifies the personality stored in the memory part 42. As described above, the personality modifying part 45 changes the attributes (i.e., age, occupation, place of residence, personal history, taste, and disposition) of the personality which are set according to the usage information and vehicle body information stored in the memory part 42. For example, when the cumulative years of use stored in the memory part 42 is more than predetermined years of use, the age, which is stored as one of the attributes of the personality, is incremented. As for the occupation, the occupation to be set according to the driving tendency information and vehicle body information varies when any information included in the obtained driving tendency information satisfies a predetermined condition (such as when the value of the information exceeds a predetermined threshold or falls within a predetermined range) or when information included in the vehicle body information is rewritten, and, in this case, the stored occupation is changed. In this manner, the personality modifying part 45 changes the attributes of the personality stored in the memory part 42 based on the usage information. When the experience-based variable information, the driving tendency information, and the vehicle body information do not satisfy predetermined conditions, the personality modifying part 45 maintains the personality as stored in the memory part 42 without any change. After modifying the personality or determining that the personality should not be modified, the process proceeds to step S5.

At step S5, which is a conversation information output step, the creating part 46 creates conversation information by executing an information process system such as neural network based on the personality stored in the memory part 42 and sound information input through the sound input part 37 of the sound device 12. The created conversation information is sent to the sound device 12 from the conversation information output device 13 via the mobile information terminal 25 and the vehicle body-side wireless communication part 24 at a timing determined by the creating part 46 according to the personality stored in the memory part 42. The conversation information is output from the sound output part 36 to the driver R in the form of sound information. After output of the sound information to the driver R, the conversation information output process returns to step S3 and is repeated until the main power supply switch of the motorcycle 2 is operated and the conversation information output device 13 is notified of output of OFF signal from the main power supply switch.

As described above, the conversation information output device 13 is configured to set a personality for giving human-like characteristics to the motorcycle 2 and create conversation information based on the personality. That is, the conversation information output device 13 enables the driver R to feel as if he/she were having a conversation with the motorcycle 2. The personality is modified according to how the motorcycle 2 has been used by the driver R, and a change in the personality causes a change in the conversation information to be created. Thus, the variety of conversation information created by the conversation information output device 13 can be increased, and the driver R driving the motorcycle 2 can feel as if he/she were having a conversation with a passenger.

Since the experience-based variable information is used by the conversation information output device 13 to modify the personality, the personality can be changed with increasing experience of the driver in using the motorcycle. Thus, the variety of conversation information to be output can be increased with increasing experience of the driver in using the motorcycle. That is, the driver R can feel as if the motorcycle 2 also gained experience and changed with increase of the driver R's experience in using the motorcycle. The driving tendency of the driver R varies depending on who the driver R is, and the driving tendency information which is information related to the driving tendency is used by the conversation information output device 13 to modify the personality. This can further increase the variety of conversation information. Further, the conversation information output device 13 takes into account the vehicle body information when modifying the personality. That is, the personality is modified not only according to how the motorcycle 2 has been used but according to the state of the motorcycle 2 itself, and this leads to further increased variety of conversation information. The use of the vehicle body information allows the driver R to freely modify the personality of the motorcycle 2 irrespective of how the motorcycle 2 has been used, thus providing improved convenience for the driver R.

In the conversation information output device 13, the personality modifying part 45 and the creating part 46 which need to have high processing capacity are disposed in the cloud server 14 which is remote from the motorcycle 2. Since the motorcycle 2 is constructed of many component parts arranged very closely, the design flexibility of the overall configuration is not high, and the installation of high-capacity processing devices may be impossible. When the personality modifying part 45 and the creating part 46 are disposed in the cloud server 14, the design flexibility of the processing devices for implementing the personality modifying part 45 and the creating part 46 can be increased since the cloud server 14 allows higher design flexibility of component parts than the motorcycle 2. Therefore, for example, processing devices having high processing capacity can be employed to implement the personality modifying part 45 and the creating part 46.

In the conversation information output device 13, the personality is stored in the memory part 42 in association with the identification information. Thus, the identification information may be associated with the driver R rather than the motorcycle 2 so that when the driver R switches from one motorcycle 2 to another motorcycle 2, the personality can be transferred to the other motorcycle 2. After the driver R switches from one motorcycle 2 to another, the personality need not necessarily be transferred to the other motorcycle 2, and the set personality may be deleted. It is not necessary that all information related to the personality be deleted, and only some information associated with the identification information (specific key words or information stored during a specific period of time) may be deleted. When the owner of the motorcycle 2 is changed from the driver R to another person, it is preferable to delete all information associated with the identification information. The change of the owner of the motorcycle 2 can be detected based on the voice pattern of the drivers.

In the conversation information output process, the cumulative record of traveled areas as usage information is stored into the memory part 42 at step S3, which may be referred to as an experience information storing step. Further, when the travel area received from the server-side wireless communication part 41 is included in the cumulative record of traveled areas, the creating part 46 creates and outputs conversation information notifying that the currently-traveled area is a previously-traveled area at step S5, which may be referred to as an experience information output step. This makes it possible to give the driver R the impression of sharing memory of experiences undergone during travel with the straddle vehicle, leading the driver R to develop an affection for the vehicle. Step S3, which may be referred to as an experience information storing step, may be carried out in such a manner that conversation information includes comments on the current driving operations as compared with the driving operations made in the past.

Other Embodiments

In the conversation information output device 13 of the present embodiment, the usage information is used mainly for personality modification. However, the usage information may be used also for creation of conversation information. When the usage information is used for creation of conversation information, a new personality need not necessarily be created. The contents of the conversation represented by the conversation information, the timing of output of the conversation information, and the frequency of conversation information output may be changed directly based on the usage information. In the conversation information output device 13 of the present embodiment, emotional factors may be used in addition to the personality. The emotions are in accordance with the personality serving as a rule for creation of conversation information and are generated based on, for example, the usage information to cause temporary changes to the rule for creation of conversation information (changes like rise and fall of emotions such as delight, anger, sadness, and pleasure). In the conversation information output device 13 of the present embodiment, the emotional factors may be used instead of the personality attributes as described above, and the wide variety of conversation information may be ensured by combinations of the emotional factors.

In the conversation information output device 13, the conversation information to be output may vary depending on the driving time per unit period of time. For example, when the driving time per unit period of time is long, conversation information is output which incorporates the contents and tone of conversations which would be made by a person who is in a good mood. That is, when the driver drives the vehicle regularly, conversation information representing a good mood is output, and when the driver has not driven the vehicle for a long period of time, conversation information is output which represents a bad mood which a person having the feeling of being neglected would be in. Further, the conversation information to be output may vary according to the tendency of the travel time (i.e., according to whether a long-time travel is often performed or a short-time travel is often performed). The conversation information to be output may vary when the driver R is driving in a manner deviating from the previous driving tendency. Further, when the driver has traveled a wide range of travel areas, an open-minded personality may be set. In this case, conversation information representing a good mood is output while the driver is traveling an area different from usually traveled areas. When the driver travels always the same areas, a cautious personality may be set. In this case, if the driver travels an area different from the usually traveled areas, conversation information incorporating the contents and tone suggesting nervousness is output. When the motorcycle 2 has often been subjected to vehicle maintenance, consumables replacement, and vehicle washing, conversation information representing a good mood is output. When the motorcycle 2 has rarely been subjected to vehicle maintenance, consumables replacement, and vehicle washing and continues to be used in a warning state determined by the controller 20, conversation information representing a bad mood is output. Once the warning state determined by the controller 20 is resolved, conversation information representing a good mood is output.

When the motorcycle is traveling at the maximum speed or acceleration or when the motorcycle is tilted at the maximum bank angle, the conversation information output device 13 outputs conversation information representing the emotion of excitement. Additionally, the conversation information output device 13 outputs conversation information representing the emotion of delight in the following situations: when the driver has been able to cross successive intersections on green lights; when the driver has not been caught in a traffic jam; when the driver is traveling on a smooth ground surface; when the driver has arrived early at the destination; when the cumulative travel distance displayed by the instrument group 22 is a nice round number; and when the driver is traveling alongside another motorcycle of the same manufacture or type. Conversely, the conversation information output device 13 outputs conversation information representing the emotion of sadness in the following situations: when the driver has been forced to stop at red lights many times; when the driver has been caught in a traffic jam; when the driver is traveling on a rough ground surface; and when the driver has arrived late at the destination. Additionally, conversation information representing a kind of emotion is output in the following situations: when the ABS is acting; when traction control is being executed; when wheelie is suppressed; when slip is determined to have occurred; when limp home mode is being executed; when tandem riding is performed; when the tandem state is resolved; when the driver is traveling on a special terrain (such as a racing circuit, a pass, or a mountain route); when the driver has lost his/her way; when the driver has caught up with, overtaken, or been overtaken by, another vehicle; when the driver is traveling alone or with touring companions; when the driver has got separated from companions; when the driver is traveling through a tunnel; when the driver is driving in a manner deviating from the usual driving tendency; when the motorcycle is returned to the driver after official vehicle inspection or vehicle maintenance; when the driver is traveling outside the range over which the mobile information terminal 25 can receive electric waves (i.e. outside the service area of the mobile information terminal 25); when the driver has performed a driving operation as per advice given from the motorcycle 2; when the driver has failed in a gear shifting operation on the motorcycle 2; when the driver has accomplished a smooth gear shifting operation; and when the driver is determined to have improved his/her driving skill.

In the conversation information output device 13 of the present embodiment, the personality may be set based on travel areas which have been initially set or based on travel areas which have been frequently traveled. For example, the attributes of the place of residence are set according to the travel areas, and the personality is defined based on the attributes of the place of residence. In this case, different personalities can be set depending on the travel areas, and a wide variety of responses can easily be achieved.

In the conversation information output device 13 of the present embodiment, the vehicle body information may include not only what or how component parts are mounted but also what accessories such as decorative parts are attached. For example, a property that influences the personality is set for an accessory to enable changing the personality by attachment of the accessory. For example, when a part endowed with a property that contributes to improving the travel performance is attached, the personality is changed to that of a person who is confident in his/her physical strength. When an accessory endowed with a property suitable for touring is attached, the taste is set to "keen traveler".

In the conversation information output device 13 of the present embodiment, the personality is modified upon a change in information included in the experience-based variable information, and such a modification of the personality allows the driver R to feel as if the motorcycle 2 were growing with the driver R. However, the conversation information output device 13 is not necessarily limited to such a configuration. That is, it is sufficient that the personality be changed according to the experience-based variable information. For example, the personality may be set so that introductory operation guidance or travel assistance information is frequently output as conversation information until the driver acquires a certain level of experience in using the motorcycle (e.g., until a cumulative parameter reaches a predetermined level). When the driver is determined to have acquired sufficient experience in using the motorcycle, the personality may be set so that advanced operation guidance or travel assistance information is output as conversation information less frequently than when the driver is less-experienced. When the driver is less-experienced, the personality may be set so that conversation information incorporating emotionless tone is output or the frequency of conversations is reduced. The personality may be changed with increasing volume of information such as usage experience and other information included in the usage information. Thus, basic setting of the personality, i.e., initial setting of the personality, may be made when the driver is still less-experienced, and the personality may be developed or modified based on the usage information as the volume of the obtained usage information increases. This allows conversation information to vary widely according to the change in experience.

The initial setting of the personality of the motorcycle 2 is selectively made by the driver R. Alternatively, the initial setting may be made as follows. That is, the initial setting of the personality may be made with reference to the type of the motorcycle 2, the newness of the motorcycle 2 (i.e., whether the motorcycle is new or secondhand), the setting of the component parts, the geometry of the vehicle body, and information related to the type of a motorcycle previously owned by the driver.

For the conversation information output device 13 of the present embodiment, the geometry of the vehicle body and the setting of the suspensions have been mentioned as examples of the vehicle body states included in the vehicle body information. However, the vehicle body information may include other information. For example, the vehicle body states included in the vehicle body information may include the position of the handle, the position of the swing arm, the caster angle, the distance between the front and rear wheels, the vehicle body height, the height of the seat, the initial positions of the suspensions, and the positions of the steps, and the personality may be modified based on these information. The vehicle body information may include not only concrete information as mentioned above but also any geometrical setting information of the vehicle body when geometrical setting defining the dimensions and movable ranges of the component parts which influence the behavior of the vehicle body can be changed. Further, when the control mode can be changed depending on control conditions such as conditions for control of the engine and conditions for control of the vehicle body parts such as the brakes and suspensions, the vehicle body information may include information of the control mode having been set, and the personality may be modified based on such information.

In the conversation information output device 13 of the present embodiment, the creating part 46 creates conversation information by executing an information process system such as neural network, expert system, or random forest. Conversation information may be created with reference to information as listed below. That is, the creating part 46 may create conversation information based on the following information: the outside temperature, ground surface temperature, and illuminance detected by the external environment sensor group 33; and information obtainable by the mobile information terminal 25 through the Internet, such as the humidity, weather, time zone of travel (including the date, time, and day of the week), wind velocity, and traffic conditions; and the friction coefficient μ and the state of the ground surface which are determined based on the detection results of the sensor groups 31 and 32.

In the conversation information output device 13 of the present embodiment, the personality modifying part 45 may be configured to modify the personality when a predetermined area is arrived at. Once the predetermined area is arrived at, the creating part 46 may create conversation information that motivates the driver to go to a particular spot.

In the conversation information output device 13 of the present embodiment, the experience-based variable information may, as mentioned above, include the number of times of fueling. The experience-based variable information may include the frequency of fueling. In this case, for example, when the frequency of fueling is low, i.e., when the motorcycle is not fueled until the remaining amount of fuel becomes small, the personality is set to have a daring disposition. Conversely, when the frequency of fueling is high, the personality is set to have a careful disposition.

The conversation information output device 13 of the present embodiment may be configured to allow the driver to preliminarily select the degree to which the personality will be changed. For example, the conversation information output device 13 may be configured to allow the driver to set the rate of change in personality, prohibit changing of the personality, or reset the personality. The personality may be modified according to the liking of the driver; for example, the contents of the conversation information output from the conversation information output device 13 may be such that the driver can feel as if he/she were having a conversation with a passenger or such that the driver can feel as if he/she were having a conversation with a driving instructor.

In the conversation information output device 13 of the present embodiment, the attributes of the personality include sex, age, occupation, place of residence, disposition, and taste. Each attribute is set as described above. However, the described manner of setting of the attributes is only illustrative, and the attributes may be set as follows. For example, the age may be increased with improving driving skill of the driver R. The age to be set may be determined from the driving tendency of the driver R or may be determined according to the kind of people who are the main buyers of the type of the motorcycle 2. The elapsed years from the manufacturing year may be set as the age. The age may be reduced when the motorcycle 2 is subjected to routine inspection, official vehicle inspection, or parts replacement at an official dealer.

As to the occupation, for example, when the driver drives the motorcycle often or every day, the occupation may be set to a "skilled artisan" of placid disposition. When the driver drives the motorcycle only occasionally or on weekends, the occupation may be set to a "child" (or "puppy") of high energy and intense curiosity. When the driving is like that performed by a beginner, the occupation may be set to a "teacher" who likes to teach. When the driving is like that performed by a skilled driver, the occupation may be set to a "salesperson" who offers many compliments. When the driving is careful and smooth, the occupation may be set to a "butler" who is courteous.

As to the place of residence, when the most usually traveled area is an urban area, the place of residence is set to "urban area", while when the most usually traveled area is a rural area, the place of residence is set to "rural area". As with the age, the place of residence may be set according to the kind of people who are the main buyers of the type of the motorcycle 2. As to the disposition, for example, the disposition may be set to become more docile over time just as a restive horse gradually becomes tamed. The disposition may be set, for example, to "good patience", "easily bored", "self-indulgent", "coward", "daring", or "responsible" based on the previous driving tendency and experience. The personality may be set depending on the driving tendency. When the driver often goes touring, the disposition may be set to "easy-going", while when the driver often goes sport driving, the disposition may be set to "quick-tempered". Further, when the motorcycle 2 is frequently subjected to vehicle maintenance and vehicle washing, the disposition may be set to "tidy". The disposition may be set according to the type of the tires. The disposition may be set according to the geometry or type of the motorcycle 2. For example, when the motorcycle 2 is of the luxury type, the disposition may be set to "proud". When the motorcycle 2 is of the off-road type, the disposition may be set to "hardy and tough". Further, the disposition may be set according to the most usually traveled area so that the personality incorporates the nature of people living in the area.

The conversation information output device 13 of the present embodiment may, when there is a hard experience undergone during previous travel, create conversation information the contents of which are related to the travel experience. When the motorcycle 2 is left unused for a long period of time or is often driven by a person other than the driver R, the conversation information output device 13 may create conversation information representing the emotion of jealousy. Conversation information may be created which informs the driver R of the state (not only failed state but good state) of the motorcycle 2 just as a person informs another person of his/her health condition.

The conversation information output device 13 of the present embodiment is implemented by the cloud server 14. However, the conversation information output device 13 may be mounted in the motorcycle 2. In this case, the vehicle body-side output device 11 and the conversation information output device 13 may be embodied by one electronic device or may be embodied by separate electronic devices which are connected by wire. The conversation information output device 13 may be implemented by the mobile information terminal 25.

In the conversation information output device 13 of the present embodiment, the usage information obtaining part 43 performs processing based on various received information to obtain the usage information. Instead, the controller 20 and the mobile information terminal 25 may create the usage information based on various information. In this case, the server-side wireless communication part 41 serves as the obtaining part. Although the conversation information output device 13 of the present embodiment outputs conversation information to the driver R driving the motorcycle 2, conversation information may be output to the driver R driving a four-wheel automobile.

REFERENCE CHARACTERS LIST

2 Motorcycle (vehicle)
13 Conversation information output device
41 Server-side wireless communication part (outputting part)
43 Usage information obtaining part
45 Personality modifying part
46 Creating part

The invention claimed is:

1. A vehicle conversation information output device configured to output conversation information to a driver driving a vehicle, the conversation information being created according to a predefined personality, the device comprising:

a memory part that stores a plurality of default personalities different from each other;
an obtaining part that obtains usage information related to how the vehicle has been used by the driver, the usage information including experience-based variable information that varies with increasing experience of the driver in using the vehicle;
a modifying part that modifies one default personality selected from the group consisting of the plurality of default personalities, based on the experience-based variable information;
a creating part that creates conversation information to be output to the driver based on the selected personality modified by the modifying part; and
an outputting part that outputs the conversation information created by the creating part to the driver,
wherein the conversation information includes at least one of a content of conversation or a frequency of conversation.

2. The vehicle conversation information output device according to claim 1, wherein the experience-based variable information includes a cumulative record of traveled areas.

3. The vehicle conversation information output device according to claim 1, wherein the usage information includes driving tendency information representing the tendency of driving operations performed by the driver during travel.

4. The vehicle conversation information output device according to claim 1, wherein the modifying part is configured to stop modifying the personality when a predetermined condition is satisfied, the predetermined condition including a condition that a predetermined driver's operation is performed.

5. The vehicle conversation information output device according to claim 1, wherein the usage information includes vehicle body information related to a vehicle body of the vehicle.

6. The vehicle conversation information output device according to claim 5, wherein the vehicle body information includes types of component parts or maintenance information.

7. The vehicle conversation information output device according to claim 1, further comprising:

a personality modifying part configured to cause the driver to select any one of the default personalities stored in the memory part as the predefined personality.

8. A vehicle conversation information output method for outputting conversation information to a driver driving a vehicle, the method comprising:

storing a plurality of default personalities different from each other;
obtaining usage information related to how the vehicle has been used by the driver, the usage information including experience-based variable information that varies with increasing experience of the driver in using the vehicle;
modifying one default personality selected from the group consisting of the plurality of default personalities, based on the experience-based variable information; and
outputting conversation information to the driver based on the obtained usage information, wherein
the conversation information includes at least one of a content of conversation or a frequency of conversation.

9. The vehicle conversation information output method according to claim 8, further comprising:

storing experience information in memory, the experience information being related to an experience undergone by the driver during travel; and outputting the stored experience information.

10. A vehicle conversation information output device configured to output conversation information to a driver driving a vehicle, the conversation information being created according to a predefined personality, the device comprising:

a memory part that stores a plurality of default personalities different from each other;

an obtaining part that obtains usage information related to how the vehicle has been used by the driver, the usage information including experience-based variable information that varies with increasing experience of the driver in using the vehicle;

a modifying part that modifies one default personality based on the experience-based variable information usage information;

a creating part that creates conversation information to be output to the driver based on the selected personality modified by the modifying part; and an outputting part that outputs the conversation information created by the creating part to the driver, wherein the personality includes at least one of sex, age, occupation, place of residence, taste, or disposition.

* * * * *